Oct. 18, 1960

J. A. FARRIS 2,957,139

LINEAR FREQUENCY COUNTING

Filed Aug. 8, 1957

INVENTOR.
JOSEPH A. FARRIS

BY

ATTORNEYS

United States Patent Office 2,957,139
Patented Oct. 18, 1960

2,957,139
LINEAR FREQUENCY COUNTING

Joseph A. Farris, Xenia, Ohio, assignor to the United States of America as represented by the Secretary of the Air Force Filed Aug. 8, 1957, Ser. No. 677,168

5 Claims. (Cl. 328—26)

(Granted under Title 35, U.S. Code (1952), sec. 266)

The invention described herein may be manufactured and used by or for the United States Government for governmental purposes without payment to me of any royalty thereon.

The present invention relates to linear frequency counting and particularly to conversion of a square-wave input signal into a positive D.C. voltage, for control of the counting operation.

It is well known in the art to have a radio altimeter of the type in which the height of an aircraft above the terrain is measured in terms of the frequency difference between the transmitted and received wave train, with frequency being represented in the form of a pulse count. Since the amplitude of such a wave varies in accordance with transmitter amplitude modulation, the corresponding pulse count has a characteristic of varying amplitude in accordance with the transmitter amplitude modulation characteristic and other factors.

One feature of the present invention is to provide an altitude indicator insensitive to the received signal amplitude variations.

Another feature of the present invention is to make possible modification of a terrain clearance radio altimeter to provide linear output D.C. voltage with height variations, wherein linear operation occurs from 175 c.p.s. to 3500 c.p.s. and corresponds to 0 to 116 feet altitude, respectively.

Still another feature of the linear counter of the present invention is its adaptability for use in algebraic voltage addition circuits.

An additional feature of the linear counter of the present invention is its adjustable linearity control.

An added feature of the linear counter of the present invention is the simplicity of its construction.

The above stated and other features and advantages will become apparent from the following description when taken with the accompanying drawings illustrating two embodiments of the invention. The drawings are for purpose of description and not to be construed as defining the scope or limits of the invention, reference being had for the latter purpose to the appended claims.

In the drawings wherein like reference characters refer to like parts in the different figures.

Figure 1:
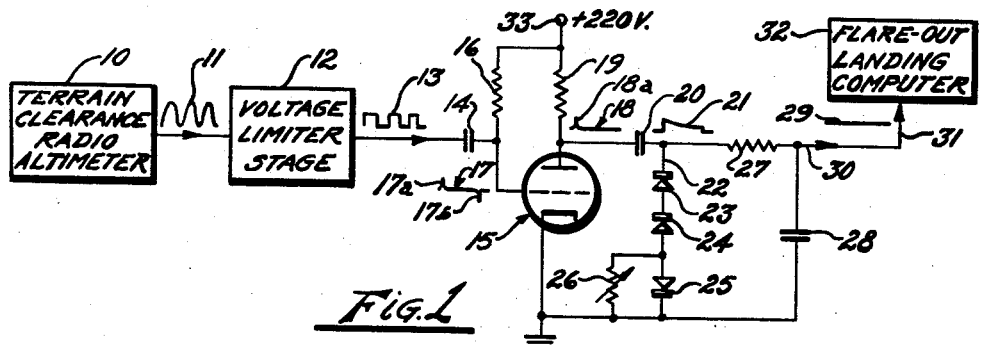
Fig. 1 is a schematic showing of one embodiment of my linear frequency counter as used in conjunction with a limiter stage and a differentiation stage.

As seen in the embodiment shown in Fig. 1, a conventional terrain clearance radio altimeter 10, which is mounted on an aircraft in flight, generates a train of sine-wave voltage signals 11, indicative of the height said aircraft is above the ground. Sine-wave voltage signals 11 are then fed to voltage limiter stage 12, which will clip the peaks of signals 11, so that the outputs of limiter stage 12, are in the form of square-wave voltage signals 13 of constant amplitude but of variable frequency. The average frequency of square-wave voltage signals 13 are proportional to the terrain clearance height of the antenna of said radio altimeter 10.

Square-wave voltage signals 13 are then fed to a grid RC circuit, comprising grid capacitor 14, and grid resistor 16, so that voltage signals 13 are changed to differentiated voltage signals 17. Said voltage signals 17 comprise positive pulses 17a and negative pulses 17b, which are approximately 200 microseconds in width. Voltage signals 17 are then applied to the grid of triode 15, which is biased to saturation with grid resistor 16 returned to B+ source 33. Therefore, the positive pulses 17a will not be reflected in the output voltage signals 18 of the plate circuit of triode 15, and only negative pulses 17b will be effective in altering the plate voltage of triode 15 from its saturation value. Since in the normal operation of a triode, the input pulses to the grid are reflected as inverted pulses at the plate, negative pulses 17b will generate positive pulses 18a at the plate of triode 15. Pulses 18a of frequency determined by altitude, with a width of approximately 200 microseconds, appear at the plate of triode 15. The voltage in the plate circuit from plate voltage source 18 is regulated by plate resistor 19.

Positive pulses 18a are applied to a .01 microfarad condenser 20, which builds up a charge due to the non-linear characteristic of diodes 23, 24, 25. Since diodes 23 and 24 are connected in series with their cathode side connected to the condenser 20, said diodes will offer low resistance to the flow of electrons through line 22 and said diodes to ground. Diodes 23 and 24 offer high resistance to the flow of electrons required when line 22 becomes positive due to the signal coupled through capacitor 20. This action will cause capacitor 20 and diodes 23, 24 and 25 to produce voltage 21 at line 22, the time constant of said voltage transient being approximately .05 second.

The discharged voltage signals 21 from condenser 20, will take the non-linear form, shown in Fig. 1, and the arrangement of diodes 23, 24 and 25 will aid in restoring the D.C. wave form of voltage signals 18.

As is characteristic of a diode-condenser-type counter circuit, the D.C. output voltage will normally be non-linear with changes in frequency. To compensate for such non-linearity, a potentiometer 26 placed in parallel with diode 25, is used to adjustably control the linearity of the output.

Resistor 27 and condenser 28 placed across the output of the diode line, act as a filter circuit to smooth out the D.C. voltage 21.

The D.C. voltage signal 29, is then applied through line 31 to flare-out landing computer 32, as described in my co-pending application No. 725,765 entitled Flare-Out Aircraft Landing System, filed April 1, 1958.

In summary, the terrain clearance radio altimeter 10, by means of the counter circuitry, shown in Fig. 1, provides linear D.C. output voltage signals with variations in height to computer 32, to aid in manual or automatic flare-out landing of an aircraft.

Figure 2:
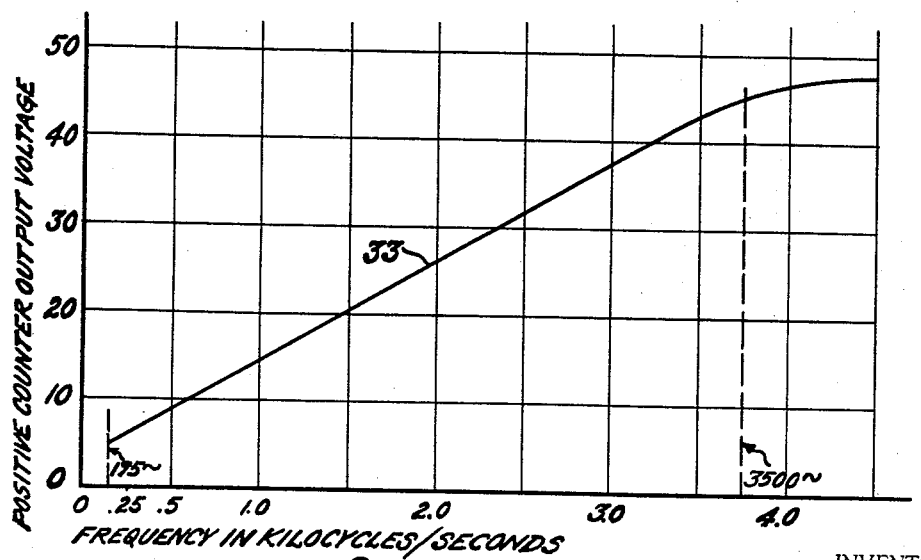
Fig. 2 is a graph illustrating the linear relationship between the positive output voltage of the counter as plotted against changes in frequency corresponding to altitude.

Fig. 2 shows a graph of the positive output voltage signals 29 as applied through line 31 to counter 32, as fed to the counter circuit from altimeter 10, wherein said signals 29 are plotted against the frequency of signals 11. It is noted from the curve 33 of the graph of Fig. 2, that operation is substantially linear from 175 c.p.s. to 3500 c.p.s., which corresponds to heights of from 0 to 116 feet, respectively.

Figure 3:
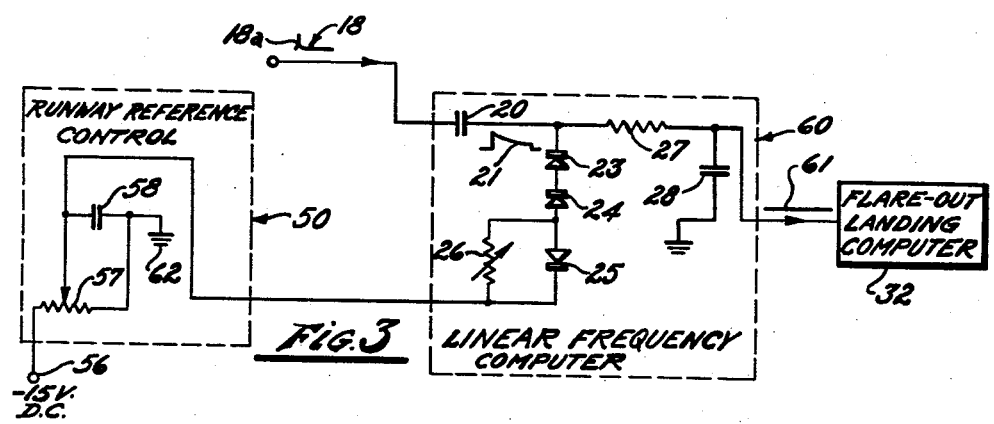
Fig. 3 is a modification of the embodiment shown in Fig. 1, as used in conjunction with algebraic voltage adding circuits.

In the modification, shown in Fig. 3, wherein similar components and wave-forms as shown in the embodiment of Fig. 1 are designated, by the same reference numerals, a negative D.C. voltage from runway reference control 50 is algebraically added to the linear voltage signals generated by counter 60, to produce a linear D.C. output voltage 61. Linear D.C. output voltage 61 is then fed to flare-out computer 32 which alters the flare-out flight path of an aircraft in flight in accordance with the voltage 18 derived from the altimeter 10, and as modified by the D.C. voltage component from the runway reference control 50.

The runway reference control 50, comprises a potentiometer 57 which regulates the negative bias applied to the diode string comprising diodes 23, 24 and 25, from negative D.C. voltage source 56.

The counter 60 includes a similar arrangement of components and operates in a similar manner to the counter circuitry shown in the embodiment of Fig. 1, with the exception that the diode string is ungrounded, and a condenser 58 is inserted in parallel with potentiometer 57. Potentiometer 57 and condenser 58 are connected to ground at 62.

The purpose of condenser 58 is to block out any undesirable frequencies that may alter the shape of the desired linear D.C. output voltage signals 61.

In place of a 10,000 ohms potentiometer 26, in both the embodiments of Figs. 1 and 3, a fixed resistor of about 2,200 ohms may be substituted, therefor. Obviously, with a fixed resistor, no adjustment of linearity may be made.

In the embodiment of Fig. 1, a 6C4 tube may be used for the triode designated 15 and diodes 23, 24 and 25 are IN43 germanium diodes. Typical values for the other components of the embodiment of Fig. 1 are: condenser 14, 388 micro-microfarads; resistor 16, .47 megohm; resistor 19, 27,000 ohms; condenser 18, .01 microfarad; resistor 27, .75 megohm and condenser 28, .082 microfarad. The plate voltage source 33 of triode 15 is 220 volts D.C.

In the embodiment of Fig. 3, all of the values of similar components of the embodiment of Fig. 1, are the same. In addition, in the runway reference control circuit 50, potentiometer 57 has a value of 5,000 ohms and condenser 58 has a rating of .1 microfarad. Negative voltage source 56 is at 15 volts D.C.

It is noted that the values of the various components as enumerated above, are only critical in their relationship to one another and other values or equivalent components may be used to alter the characteristics of the circuit. For example, the RC time constant, determined by the values of condenser 14 and resistor 16 may be increased so that a pulse width of 300 microseconds, instead of 200 microseconds, may be obtained by increasing the value of either condenser 14 or resistor 16.

Having now described my invention in detail in accordance with the patent statutes, various changes and modifications will suggest themselves to those skilled in the art, and it is intended that such changes and modifications shall fall within the spirit and scope of the invention as recited in the following claims.

I claim:

1. A linear frequency counter circuit for changing received signals into linear direct current voltage signals, comprising means for converting said received signals into square-wave signals of constant amplitude but of a frequency proportioned to the frequency of said received signals, means for differentiating said square-wave signals into positive and negative pulses of predetermined repetition rate, electron-discharge means saturation-biased against positive voltages for completely cancelling said positive pulses and inverting said negative pulses, and means utilizing said inverted negative pulses for generating a linear output direct current voltage having a positive value proportional to the frequency of the said received signals.

2. A circuit defined in claim 1, wherein said generating means includes integrating circuitry for combining a succession of said inverted negative pulses into a single derived pulse representing a selected time interval, and means for controlling the linearity of said derived pulse to produce said linear output direct current voltage.

3. A circuit as defined in claim 2, wherein said linearity controlling means includes means for regulating the counting operation in accordance with the polarity of said integrated pulses.

4. A linear frequency counter for converting square-wave input signals into a positive direct current voltage, comprising an RC circuit for differentiating said square-wave input signals into negative and positive pulses, electron-discharge means saturation-biased against positive voltages for completely cancelling said positive pulses and inverting said negative pulses, accumulator means for collecting a predetermined count of said inverted negative pulses and generating a direct current pulse, means for controlling the linearity of said direct current pulse, and filter means for smoothing out said direct current pulse into said positive linear direct current output voltage.

5. The counter as defined in claim 4, wherein the accumulator means comprises a capacitance circuit receiving said inverted negative pulses, and integrating means controlling the output of said capacitance circuit.

References Cited in the file of this patent

UNITED STATES PATENTS

| | | |
|---|---|---|
| 2,095,261 | McCaa | Oct. 12, 1937 |
| 2,720,584 | Sloughter | Oct. 11, 1955 |
| 2,822,538 | Trevor | Feb. 4, 1958 |